(12) United States Patent
Smalley et al.

(10) Patent No.: US 9,703,855 B1
(45) Date of Patent: Jul. 11, 2017

(54) SYSTEM AND METHOD FOR CLASSIFYING CONTENT WITH A WEB SERVICE

(71) Applicants: Howard Smalley, Exeter (GB); Paul Stidworthy, Exeter (GB)

(72) Inventors: Howard Smalley, Exeter (GB); Paul Stidworthy, Exeter (GB)

(73) Assignee: CA, Inc., New York, NY (US)

( * ) Notice: Subject to any disclaimer, the term of this patent is extended or adjusted under 35 U.S.C. 154(b) by 229 days.

(21) Appl. No.: 13/862,628

(22) Filed: Apr. 15, 2013

(51) Int. Cl.
*G06F 17/30* (2006.01)

(52) U.S. Cl.
CPC .. *G06F 17/30598* (2013.01); *G06F 17/30011* (2013.01)

(58) Field of Classification Search
CPC .................. G06F 17/30705; G06F 17/30011
See application file for complete search history.

(56) References Cited

U.S. PATENT DOCUMENTS

| | | | | |
|---|---|---|---|---|
| 7,155,514 B1* | 12/2006 | Milford | ................ | H04L 41/06 370/236 |
| 8,015,158 B1* | 9/2011 | Mankovsky | ........ | G06F 11/1435 707/648 |
| 8,578,442 B1* | 11/2013 | Banerjee | ............... | H04L 63/102 709/204 |
| 8,782,792 B1* | 7/2014 | Bodke | .................... | G06F 21/53 713/187 |
| 9,087,189 B1* | 7/2015 | Koeten | ................ | H04L 41/022 |
| 2004/0083215 A1* | 4/2004 | de Jong | ........................... | 707/7 |
| 2006/0253490 A1* | 11/2006 | Krishna et al. | ............ | 707/104.1 |
| 2007/0209080 A1* | 9/2007 | Ture et al. | ........................ | 726/28 |
| 2008/0208649 A1* | 8/2008 | Ficery et al. | ........................ | 705/7 |
| 2009/0055166 A1* | 2/2009 | Moyle | ................... | G06F 21/6227 704/9 |
| 2009/0119296 A1* | 5/2009 | Neogi et al. | ........................ | 707/7 |
| 2009/0265187 A1* | 10/2009 | Boone et al. | ....................... | 705/3 |
| 2010/0050239 A1* | 2/2010 | Carter | ................... | H04L 9/3263 726/4 |
| 2010/0332401 A1* | 12/2010 | Prahlad | ............... | G06F 17/3002 705/80 |
| 2012/0023073 A1* | 1/2012 | Dean et al. | ................... | 707/693 |
| 2012/0226689 A1* | 9/2012 | Bolton et al. | ................. | 707/736 |
| 2012/0226858 A1* | 9/2012 | Steitz et al. | ................... | 711/117 |
| 2012/0303558 A1* | 11/2012 | Jaiswal | ........................... | 706/12 |
| 2013/0332982 A1* | 12/2013 | Rao | ......................... | H04L 63/08 726/1 |
| 2014/0129703 A1* | 5/2014 | Patel | .................. | G06Q 30/0625 709/224 |

* cited by examiner

*Primary Examiner* — Mohammad S Rostami
(74) *Attorney, Agent, or Firm* — Baker Botts L.L.P.

(57) ABSTRACT

A method includes receiving a classification request from a client. The request includes a content identifier indicative of a data repository. The request also includes authorization credentials. The method further includes, in response to receiving the classification request, sending a data request to the data repository. The data request includes an authorization object based on the authorization credentials. The method also includes receiving a plurality of documents from the data repository in response to the data request. The method additionally includes classifying the plurality of documents using a classification engine. The classification engine is operable to determine respective classifications for the plurality of documents. The method still further includes transmitting a response to the client. The response includes the classifications.

20 Claims, 3 Drawing Sheets

SYSTEM AND METHOD FOR CLASSIFYING CONTENT WITH A WEB SERVICE

BACKGROUND

The disclosure relates generally to content classification, and more specifically to a system and method for classifying content with a web service.

SUMMARY

According to one embodiment of the disclosure, a method includes receiving a classification request from a client. The request includes a content identifier indicative of a data repository. The request also includes authorization credentials. The method further includes, in response to receiving the classification request, sending a data request to the data repository. The data request includes an authorization object based on the authorization credentials. The method also includes receiving a plurality of documents from the data repository in response to the data request. The method additionally includes classifying the plurality of documents using a classification engine. The classification engine is operable to determine respective classifications for the plurality of documents. The method still further includes transmitting a response to the client. The response includes the classifications.

Other objects, features, and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the objects, features, and advantages thereof, reference now is made to the following description taken in connection with the accompanying drawings.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer-readable medium that when executed can direct a computer, other programmable data processing apparatus, or other devices to function in a particular manner, such that the instructions when stored in the computer-readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Document classification systems are increasingly used by organizations to compartmentalize sensitive information from unintentional or deliberate exposure to public sources. For example, a government organization retains sensitive information on servers for use in testing, certification, and production environments. The same issue exists in private corporations with sensitive company secrets, sales data, and customer records. Employees sometimes need to transmit such sensitive data to other employees or groups of the organization. However, such free sharing of content throughout an organization increases the risk of human error in exposing sensitive data to external and un-cleared sources. Internal processes and control checks may not eliminate the spread of such sensitive information.

Data repositories containing many classified or sensitive records pose an especially grave risk because of the volume of sensitive records stored on such media. In this instance, a malevolent user, employee, or hacker may access a large store of sensitive information by obtaining only minimum security credentials. Further, such repositories may start unclassified and become sensitive through unintentional employee interaction, or may contain classified information, unbeknownst to the organization. For example, in an effort to work around company data transfer processes, an employee establishes a shared network drive on their computer, exposing sensitive information. In another instance, an employee responds to a message thread but, in an effort to explain his reasoning, unintentionally incorporates sensitive information in the response.

Figure 1:
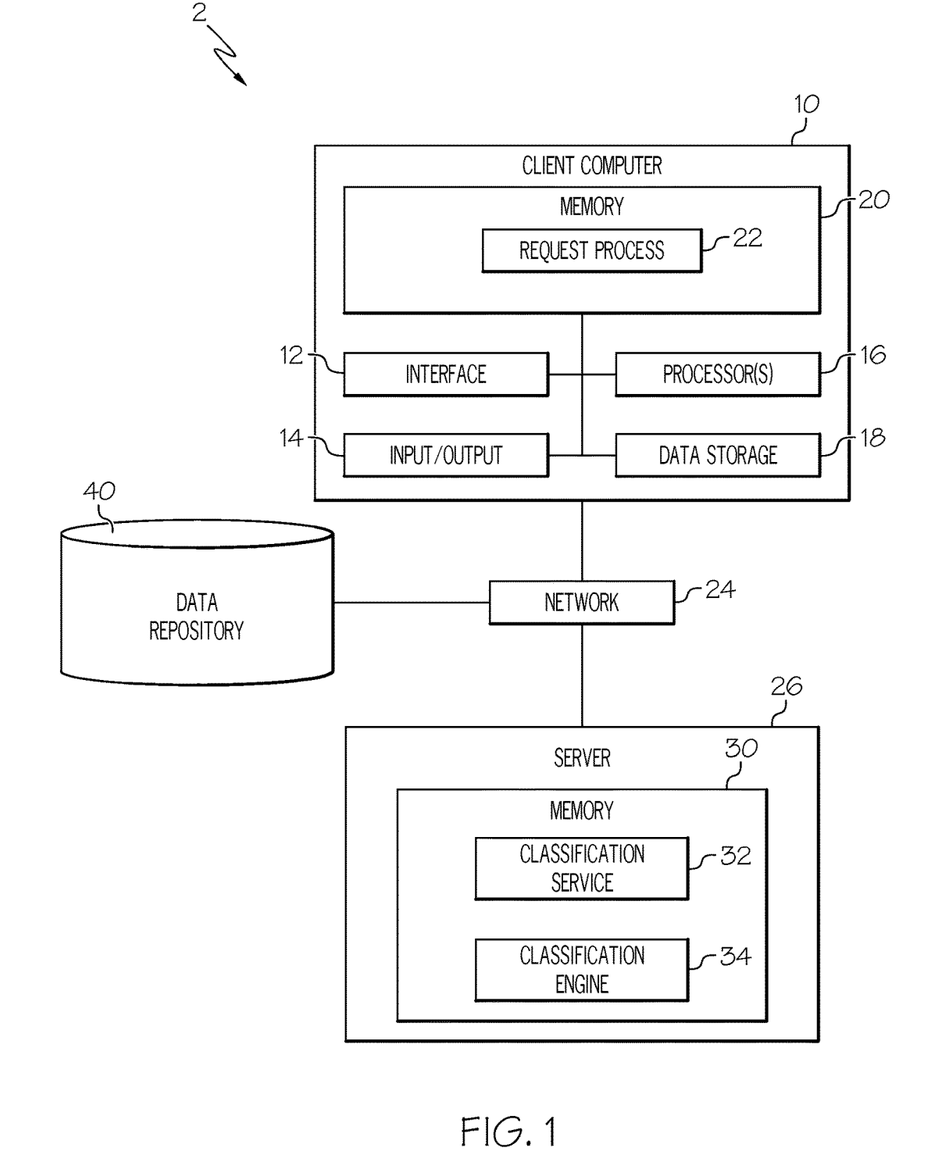
FIG. 1 illustrates a block diagram of a system for classifying content with a web service in accordance with a particular embodiment.

In reference to FIG. 1 a system 2 for classifying content with a web service is illustrated according to a non-limiting embodiment of the present disclosure. System 2 comprises a client computer 10, a data repository 40, a server 26, and a network 24. Client computer 10, data repository 40 and server 26 are all connected via network 24, and may additionally be connected to further internet and intranet networks. It should be understood that system 2 depicted in FIG. 1 is illustrative only and could include any number of client computers 10, data repositories 40, servers 26, and any number of other systems (e.g., service consumers, third party systems, and other networks).

In a particular embodiment of system 2, request process 22 running on client computer 10 initiates a request to classify a set of archived documents stored on data repository 40. For example, an organization may require that the stored documents be made publicly available; however, the contents of the documents may not be suitable for external dissemination. In this embodiment, classification service 32 on server 26 receives the classification request from client computer 10. The request contains authorization credentials required to access the data repository 40. Classification service 32 authorizes and authenticates against data repository 40 using the credentials supplied in the web request. Classification service 32 downloads the archived data from data repository 40, and extracts documents from the data. Classification service 32 sends the extracted documents to a classification engine 34. The classification engine determines respective classifications for each document, and classification service 32 transmits a response to client computer 10 containing the classifications.

System 2 may be maintained by a vendor that offers IT management software and solutions for different cloud IT service provider needs and comprises a plurality of servers 26, client computers 10, and data repositories 40. Alternatively, system 2 may comprise physical hardware devices maintained and operated by a private organization. In still other embodiments, certain components of system 2 may be maintained in a cloud environment with network 24 access to physical components. For example, server 26 may be hosted in a public cloud environment with network access to an organization's internal servers (e.g., company intranet access). Any number of physical client computer 10 may access server 26 in the above example.

Each of the components 10, 40, and 26 within network 24 is configured to communicate with each other system via any suitable network connection 24 that supports such communications, such as a WAN connection. Further, the network interface 12 in client computer 10 and the interfaces in each of the other components 40 and 26 are configured to communicate with each other via any suitable wired or wireless connection that supports such communications, such as a LAN connection, a wireless LAN (WLAN) connection, a WAN connection, a cellular network connection (e.g., a Global System for Mobile Communications (GSM) connection, a Code Division Multiple Access (CDMA) connection, a Long Term Evolution (LTE) connection, etc.), or a combination of two or more of those network connections.

The client computer 10 comprises a processor 16, a memory 20, and a network interface 12. Server 26 includes similar components, though some are not pictured. The processor may include any number of suitable CPUs that are configured to execute computer program code embodied on the memory and to perform the various functions of computer 10 and server 26 as described below. The memory may include one or more types of memory (e.g., ROM, RAM, EEPROM, etc.) as required to store the computer program code executed by the processor and to support the execution of that code. And the network interface may include any number of suitable interfaces (e.g., modems, mobile browsers, wireless Internet browsers, etc.) that are configured to support communications with and between the various network devices in client computer 10 and server 26, as well as with and between the data repository 40.

In a particular embodiment, client computer 10 initiates a classification request to classify all documents in a data repository 40. Client computer 10 runs a request process 22 that initiates a web service request in order to accomplish the classification. Request process 22 runs in memory 20 using processor 16. For example, request process 22 may include custom application code that generates the web service request. The custom application code is written in a programming language (e.g., JAVA or C#) and is configured such that it creates a SOAP request conforming to a web service description language ("WSDL") document published by a classification service 32, running on server 26. The WSDL specifies the structure of the communications that classification service 32 expects and generates, and acts as a contract between client computer 10 and server 26 for communications over network 24.

In certain embodiments, the classification request is transmitted over hyper-text transfer protocol ("HTTP"). In other embodiments, the classification request is transmitted over HTTP secure ("HTTPS"). In still other embodiments, the classification request is transmitted over transmission control protocol ("TCP") and received by web services implemented by the WINDOWS COMMUNICATION FOUNDATION ("WCF").

In certain embodiments, request process 22 includes a content identifier in the request. A content identifier includes any string of characters used to identify a resource. In some embodiments, the content identifier includes a uniform resource identifier ("URI"). In other embodiments, the content identifier includes a universal naming convention ("UNC") path. In still other embodiments, the content identifier includes a uniform resource locator ("URL"). One of ordinary skill in the art should understand the teachings of the present disclosure to enable further embodiments encompassing further resource identifying conventions as content identifiers. The content identifier corresponds to the network location of data repository 40. For example, a URI may include the IP address of data repository 40, and may further indicate the directory or path to the location of the data. In another example, a UNC identifies a mapped network drive containing the data. In still another example, a URL includes a server name, a domain name or an IP address, a port number, and the path to data repository 40. Data repository 40 may be one or more of a database server, computer, web server, MICROSOFT SHAREPOINT® repository, or other network component configurable to store and serve data. Data repository 40 may include memory, hard disk, processor, network interfaces, input/output devices and other components similar to client computer 10 and server 26.

In certain embodiments memory 20 of client computer 10 includes data repository 40. In these embodiments, data repository 40 data resides in data storage 18 of client computer 10, or any other one or combination of hard disk storage devices accessible to client computer 10. In these embodiments, portions of data repository 40 are loaded into memory 20. For example, a database management processes may be loaded into memory 20 to control querying and data access to data repository 40. In other embodiments, data repository 40 is a database running on a separate database server, other server, or other computer accessible to server 26 via network 24.

A URI includes a string of characters used to identify a network resource. For example, the URI enables interaction of resources over networks using hyper-text transfer protocol ("HTTP") and/or HTTPS. In another example, the URI includes a domain name that resolves to the IP address of data repository 40.

A UNC specifies network resources in MICROSOFT WINDOWS® environments. Other computer file content resource naming conventions are applicable in the described embodiments without departing from the scope of the present disclosure.

Request process 22 further includes authorization credentials. The authorization credentials conform to the security scheme that the organization runs (e.g., Integrated Windows Authentication, Kerberos, claims based authentication, or token authentication). For example, an organization using Integrated Windows Authentication ("IWA") security allows access from a network process running on server 26 to access data on data repository 40. In that case, no authorization credentials need be passed to classification serve 32. In other embodiments, a network credential object needs to be created on server 26 in order to authorize access to data repository 40. In such a system, a username and password is passed to classification service 32 in the request.

It should be understood that references to IWA in the present disclosure are primarily made for consistency and should not limit the disclosure to such security/authentication/authorization schemes. Instead, other security schemes are interchangeable with the named scheme.

In certain embodiments, the authorization credentials may be entered by a user. In other embodiments, the credentials of the user running request process 22 may be used. In instances where the current user's authorization credentials will not allow access to the desired data repository, the user may supply credentials that will enable repository access, such as an administrator or super user account.

For example, a user logs into client computer 10 using their organization IWA credentials. The user then initiates request process 22 and requests the classification of documents in data repository 40 by specifying a UNC path such as: "\\datarepository40\share\emails". The UNC path indicates a data repository 40 directory as mapped by server 26. The user is authorized to access data repository directories. In this example, request process 22 creates a token that identifies the user's credentials and roles. When a request is sent to server 26, classification service 32 uses the user's supplied credentials using an IWA API and the supplied token. This allows classification service 32 to make data requests against data repository 40 as if the classification service 32 were run by the user.

In another example, classification service 32 runs as a network service user. This network service user from server 26 domain is granted privileges on data repository 40 and is authorized to view files on data repository 40. In such an example, using the user's supplied credentials is not necessary to access data repository 40.

In certain embodiments, classification service 32 receives the classification request, and creates the security context. Classification service 32 authenticates and authorizes against data repository 40 and downloads the data specified in the request from data repository 40.

In one example, the data downloaded is a folder that contains documents (e.g., emails, MICROSOFT WORD® documents, pdf files, email attachments, and other business documents). In such an example, classification service 32 transmits the data from repository 40 to a classification engine 34. Classification engine 34 may scan documents for predetermined character sequences and may analyze such sequences using the context of the document in order to classify documents. Classification engine 34 is optimized for such tasks and may run on the same server 26 as classification service 32.

In other example embodiments, the data downloaded from data repository 40 is archived to reduce disk space or file transfer throughput. In such embodiments, classification service may extract documents from the data downloaded from data repository 40.

The term documents as used in the present disclosure should not limit the type of data retrieved from data repository 40. Documents as used in connection with the present disclosure should, instead, mean any file format or data type, whether standards based or proprietary, used in connection with the relevant computing systems.

After classification of the retrieved data and documents is performed, classification service 32 sends the relevant classifications to client computer 10 in the form of a SOAP response. In certain embodiments, the SOAP response is a SOAP v1.2 response. In a particular embodiment, the documents and the data are sent to client computer 10. In such an embodiment, inclusion of document data in the web service response may be turned on or off, and may be off by default. A flag in the request may enable such a service.

In other embodiments, request process 22 may interact with a custom or third party application programming interface ("API") in order to generate the SOAP web service requests. For example, a developer creates a reusable web service API for communicating with classification service 32, and other classification services. That reusable component is packaged as a dynamic-link library (".dll") file and distributed to other developers for reuse. In this example, a developer of request process 22 application code references the .dll to make classification web service calls to classification service 32. Users of request process 22 then utilize request process 22 and its referenced .dlls to make classification service 32 requests. Thus, third party APIs and application developers increase the usability of classification service 32 and system 2 to a broader base of users. This saves an organization time and resources because classification engine 34 runs in a central location. Further, the .dll developer creates libraries that are compatible with, for example, LINUX® and UNIX® operating systems. In this way, the functionality of classification service 32 is shared across platforms to even more users.

Figure 2:
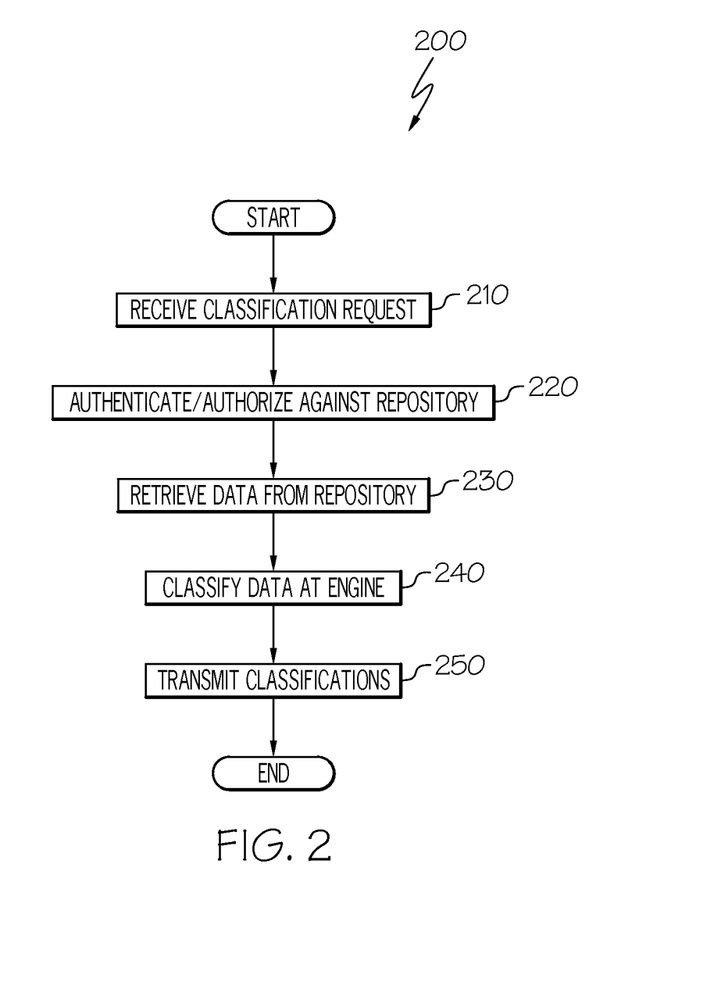
FIG. 2 illustrates a flowchart of a method for classifying content with a web service in accordance with another embodiment.

Turning to FIG. 2, a method 200 for classifying content is illustrated in accordance with a particular embodiment. The embodiment illustrated in FIG. 2 is similar to the embodiment found in accordance with the embodiments of system 2. In explaining the depicted embodiment in method 200, reference is made to the elements and components in FIG. 1.

At step 210, a classification request is received at server 26. The classification request includes a content identifier indicative of data repository 40 and authentication credentials. A service, such as classification service 32, processes the request by parsing information from the request, such as, for example, the authentication credentials and the content identifier.

A IWA token may be created at client computer 10 and sent in the classification request to classification service 32. In another example, a username and password is encrypted on client computer 10, and sent in the SOAP request for decryption on server 26.

In one particular embodiment, a URI indicative of data repository 40 includes the IP address of data repository 40, and the location of a network drive. In another embodiment, data repository 40 contains a server hosting documents that need to be classified. Request process 22 specifies a UNC path that reads: "\\datarepository40\documents\file1.docx".

In another example, data repository 40 includes a database server. In this example, request process 22 includes the database connection information required to access documents stored in data repository 40 database server. The supplied information includes username, password, server name, database name, table name and query. In a further example, the user of request process 22's IWA credentials are used on server 26 to gain access to a SQL Server database.

At step 220, the request is authenticated and authorized. For example, an IWA credential object is generated based on the information passed in the request, and those credentials are validated against data repository 40. In certain embodiments, the network service hosting classification service 32 may have the proper credentials necessary to access data repository 40.

Other example authentication/authorization schemes include username/password, claims based authentication or token authentication. The security schemes enumerated in the present disclosure should not be read to limit the security schemes that may be implemented in method 200.

At step 230, data is retrieved from data repository 40. In one example, the data retrieved includes a file folder with documents including MICROSOFT WORD®, EXCEL®, and other business documents (e.g., emails, POWERPOINT® files, Personal Storage Table files, and other standards based documents).

In another example, data repository 40 includes archived documents (e.g., *.zip, and *.rar). Such documents may be downloaded to server 26 and extracted such that the compressed documents may be retrieved.

In still another example, data repository 40 includes a database server. Documents are stored in a database table as binary large objects ("BLOBs"). The classification service 32 authenticates against the database server, and queries the table for a set of documents. The documents arrive at classification service 32, still in the BLOB format, but are converted into their original format at classification service 32. A database connectivity API is available to perform the conversion such as, for example, the ADO.net API for SQL server.

In embodiments as described in accordance with a database server data repository, queries on data repository 40 may be sent by request process 22. For example, request process 22 may request that only documents with a last changed date after November of 2012 be classified. In this example, a data repository may be periodically classified in an efficient manner. Documents that were not changed since the last classification date were classified properly according to the last classification and are not classified again, whereas the changed documents and new documents are classified.

At step 240, the documents are classified using a classification engine. Classification service 32 sends documents to classification engine 24 so that classifications may be applied to each document. The classifications are relatable to each document, and more than one classification may be applied to each document. For example, a Personal Storage Table ("PST") file may contain an employee's emails containing sensitive company information. The classification engine may detect this sensitive information by applying a predefined filter in a search across the email characters with. The classification engine generates a percentage probability that indicates a high probability of the document containing sensitive information. In such an example, the document may fall in the "Classified" and "Highly Sensitive" categories. The classifications are compiled into a list and sent back to the classification service 32.

At step 250, the classifications are transmitted back to client computer 10. In one example, only the list of classifications are transmitted to the client. The client determines which documents the classifications are applicable to by referring to the file names in the list. The file names correspond to file names in data repository 40.

In another example, step 250 transmits both the classifications and the corresponding document data. In further embodiments, only certain classification documents may be returned to client computer 10.

Figure 3:
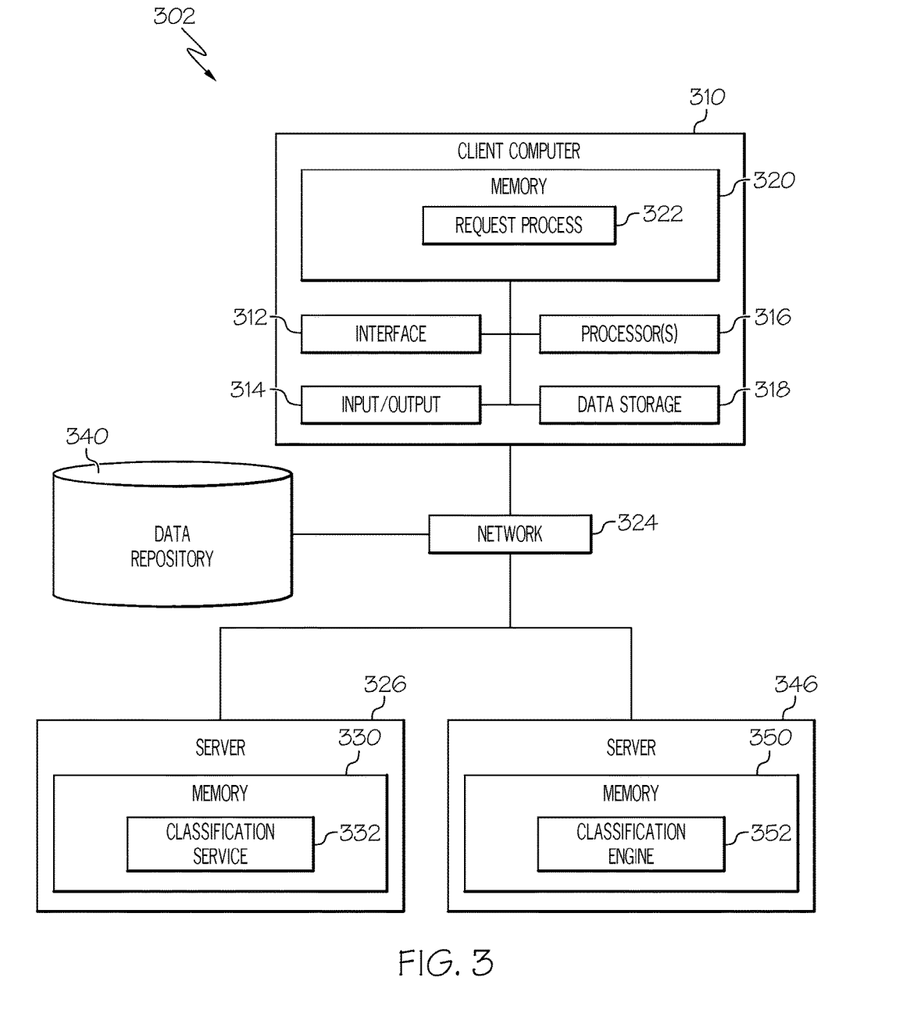
FIG. 3 illustrates a block diagram of a system for classifying content with a web service in accordance with another embodiment.

Referring to FIG. 3, another embodiment of a system 302 for classifying content is disclosed. System 302 illustrates an embodiment where the classification engine is exposed on another computer, either via a web service, an operating system service (e.g., a Windows service), a remote procedure call, or some other method of exposing functionality between network components.

In the depicted embodiment, a classification service 332 receives a classification request from request process 322. In accordance with system 2, classification services 332 authorizes and authenticates the credentials from the request with the authentication store at data repository 340, and downloads data from data repository 340. Classification service 332 extracts documents from the data, and sends requests to the classification engine. The requests may include the documents, or text from the documents. In one example, classification service 332 extracts text from each document, and makes web service requests to classification engine 352 by including the extracted text from each document in the request. Such an example may be useful in systems where classification functionality is exposed for use on network 324, and duplication of classification engine is more expensive then the throughput time for data between server 326 and server 346. Server 326, data repository 340, and server 346 may be centrally or co-located to increase bandwidth or throughput between the components.

In still other embodiments, data repository 340 may be co-located on server 326, server 346, or client computer 310. For example, a user may wish to classify the documents on a particular directory on his machine. System 302 enables the user to supply the classification service 332 with an IP address and folder name for the directory to classify, and the classification service will determine classifications for each file in the specified director. In this example, data repository 340 resides on client computer 310.

In accordance with the embodiments of the present disclosure, document classification via web services by means of pulling document data from a remote data repository is disclosed. In further embodiments, the ability to authenticate the classification service against different data repositories is disclosed. Additionally, embodiments of the present disclosure teach allowing a third party to classify documents by either sending the document to the service or allowing the service to retrieve the document from a specified location (i.e., "pulling" the data).

In a particular embodiment, a system for classifying content with a web service includes a SOAP based web service which receives document classification requests from any number of clients on any platform. The request may push the document data to the web service. Alternatively, the request may supply the web service with the location of the document data. In the latter example, the web service retrieves the data from the data location. If the web service is required to pull the data from a specific location, then a request specific set of credentials may be used to authenticate the web service against the data repository that contains the document data to be classified. Such credentials may be one or more of a username, password, role, claim, or token. In one example, the web service passes the document data to the classification engine to be processed. A list of classifiers is then returned to the client to indicate the relevant classifications of the document data.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
  receiving, at a classification process, a classification request from a client associated with an internal network of an organization to classify an archived dataset, the request comprising:
    a content identifier indicative of a remote data repository provided for the organization by a cloud service provider and corresponding to the archived dataset; and
    authorization credentials;
  determining whether the remote data repository allows access from the classification process;
  in response to receiving the classification request, sending, by a server (1) external to the internal network of the organization, (2) external to the cloud service provider, and (3) executing the classification process, a data request to the remote data repository, wherein if the remote data repository does not allow access from the classification process, including in the data request an authorization object that conforms to a security scheme of the organization based on the authorization credentials, and wherein the server is configured to provide document classification services to a plurality of organizations having documents that are stored at a plurality of cloud service providers and that are secured by different security schemes;

receiving, by the server, the archived dataset from the remote data repository in response to the data request;

in response to receiving the archived dataset, extracting a plurality of documents from the archived dataset;

classifying the plurality of documents using a classification engine, the classification engine being operable to, for each document in the plurality of documents:

determine whether the document is suitable for dissemination outside an organization based on whether the document contains sensitive information regarding the organization; and apply a corresponding classification to the document based on whether the document is suitable for dissemination outside the organization; and transmitting a response from the server to the client, the response comprising a list of each of the extracted plurality of documents and each corresponding classification.

2. The method of claim 1, wherein the plurality of documents are stored in a compressed storage format, and further comprising extracting the plurality of documents from the compressed storage format.

3. The method of claim 1, wherein the data repository comprises a database, the classification request further comprises a database query indicative of the plurality of documents, and the data request further comprises the database query.

4. The method of claim 1, wherein the authorization object comprises an Integrated Windows Authentication ("IWA") network credential object.

5. The method of claim 1, wherein the response further comprises:
the plurality of documents; and
a respective document identifier for each one of the respective classifications.

6. The method of claim 1, wherein the data repository is located at a geographically remote location from the client.

7. The method of claim 1, wherein a local memory of the client comprises the data repository.

8. A computer configured to access a storage device, the computer comprising:
a processor; and
a non-transitory, computer-readable storage medium storing computer-readable instructions that when executed by the processor cause the computer to perform:
receiving, at a classification process, a classification request from a client associated with an internal network of an organization to classify an archived dataset, the request comprising:
a content identifier indicative of a remote data repository provided for the organization by a cloud service provider and corresponding to the archived dataset; and
authorization credentials;
determining whether the remote data repository allows access from the classification process;
in response to receiving the classification request, sending, by a server (1) external to the internal network of the organization, (2) external to the cloud service provider, and (3) executing the classification process, a data request to the remote data repository, wherein if the remote data repository does not allow access from the classification process, including in the data request an authorization object that conforms to a security scheme of the organization based on the authorization credentials, and wherein the server is configured to provide document classification services to a plurality of organizations having documents that are stored at a plurality of cloud service providers and that are secured by different security schemes;

receiving, by the server, the archived dataset from the remote data repository in response to the data request;

in response to receiving the archived dataset, extracting a plurality of documents from the archived dataset;

classifying the plurality of documents using a classification engine, the classification engine being operable to, for each document in the plurality of documents:

determine whether the document is suitable for dissemination outside an organization based on whether the document contains sensitive information regarding the organization; and apply a corresponding classification to the document based on whether the document is suitable for dissemination outside the organization; and transmitting a response from the server to the client, the response comprising a list of each of the extracted plurality of documents and each corresponding classification.

9. The computer of claim 8, wherein the plurality of documents are stored in a compressed storage format, and wherein the computer-readable instructions further cause the computer to perform extracting the plurality of documents from the compressed storage format.

10. The computer of claim 8, wherein the data repository comprises a database, the classification request further comprises a database query indicative of the plurality of documents, and the data request further comprises the database query.

11. The computer of claim 8, wherein the authorization object comprises an Integrated Windows Authentication ("IWA") network credential object.

12. The computer of claim 8, wherein the response further comprises:
the plurality of documents; and
a respective document identifier for each one of the respective classifications.

13. The computer of claim 8, wherein the data repository is located at a geographically remote location from the client.

14. The computer of claim 8, wherein a local memory of the client comprises the data repository.

15. A computer program product comprising:
a non-transitory computer-readable storage medium having computer-readable program code embodied therewith, the computer-readable program code comprising:
computer-readable program code configured to receive, at a classification process, a classification request from a client associated with an internal network of an organization to classify the archived dataset, the request comprising:
a content identifier indicative of a remote data repository provided for the organization by a cloud service provider and corresponding to the archived dataset; and
authorization credentials;

computer-readable program code configured to, determine whether the remote data repository allows access from the classification process;

computer-readable program code configured to, in response to receiving the classification request, send, by a server (1) external to the internal network of the organization, (2) external to the cloud service provider, and (3) executing the classification process, a data request to the remote data repository, wherein if the remote data repository does not allow access from the classification process, including in the data request an authorization object that conforms to a security scheme of the organization based on the authorization credentials, and wherein the server is configured to provide document classification services to a plurality of organizations having documents that are stored at a plurality of cloud service providers and that are secured by different security schemes;

computer-readable program code configured to, receive, by the server, the archived dataset from the remote data repository in response to the data request;

computer-readable program code configured to, in response to receiving the archived dataset, extracting a plurality of documents from the archived dataset;

computer-readable program code configured to, classify the plurality of documents using a classification engine, the classification engine being operable to, for each document in the plurality of documents:
 determine whether the document is suitable for dissemination outside an organization based on whether the document contains sensitive information regarding the organization; and
 apply a corresponding classification to the document based on whether the document is suitable for dissemination outside the organization; and computer-readable program code configured to transmit a response from the server to the client, the response comprising a list of each of the extracted plurality of documents and each corresponding classification.

16. The computer program product of claim 15, wherein the plurality of documents are stored in a compressed storage format, the computer-readable program code further comprising computer-readable program code configured to extract the plurality of documents from the compressed storage format.

17. The computer program product of claim 15, wherein the data repository comprises a database, the classification request further comprises a database query indicative of the plurality of documents, and the data request further comprises the database query.

18. The computer program product of claim 15, wherein the authorization object comprises an Integrated Windows Authentication ("IWA") network credential object.

19. The computer program product of claim 15, wherein the data repository is located at a geographically remote location from the client.

20. The computer program product of claim 15, wherein a local memory of the client comprises the data repository.

* * * * *